(12) United States Patent
Pancotti

(10) Patent No.: US 6,367,736 B1
(45) Date of Patent: Apr. 9, 2002

(54) CONVERTIPLANE

(75) Inventor: Santino Pancotti, Gallarate (IT)

(73) Assignee: Agusta S.p.A. (IT)

( * ) Notice: Subject to any disclaimer, the term of this patent is extended or adjusted under 35 U.S.C. 154(b) by 0 days.

(21) Appl. No.: 09/585,850

(22) Filed: Jun. 1, 2000

(30) Foreign Application Priority Data

Jun. 2, 1999 (IT) .................................... TO99A0469

(51) Int. Cl.⁷ .............................................. B64C 29/00
(52) U.S. Cl. ......................... 244/7 R; 244/56; 244/48; 244/7 C
(58) Field of Search ............................ 244/7 R, 7 C, 244/6, 48, 56, 66

(56) References Cited

U.S. PATENT DOCUMENTS

| | | | |
|---|---|---|---|
| 2,621,001 A | * 12/1952 | Roman | 244/7 C |
| 2,708,081 A | 5/1955 | Dobson | |
| 2,964,264 A | * 12/1960 | Multhopp | 244/12.4 |
| 3,039,719 A | * 6/1962 | Platt | 244/7 C |
| 3,430,894 A | * 3/1969 | Strand et al. | 244/7 C |
| 3,567,157 A | 3/1971 | Dancik | |
| 4,142,697 A | * 3/1979 | Fradenburgh | 244/7 R |
| 5,096,140 A | 3/1992 | Dornier, Jr. | |

OTHER PUBLICATIONS

"Tiltable–Wing, Tiltable–Rotor Aircraft" NTIS Tech Notes, US, US Dept. of Commerce, Springfield, VA, No. 5, May 1, 1986, p. 537 (XP002023246).

Nativi, A.: "Agusta Reveals New Tiltrotor" Flight International, GB, Reed Business Information, Haywards Heath, vol. 156, No. 4688, Aug. 4, 1999, p. 5 (XP000847901).

Communication and European Search Report for European Appln. No. EP 00 11 1548 dated Mar. 7, 2001.

* cited by examiner

Primary Examiner—Galen L. Barefoot
(74) Attorney, Agent, or Firm—Pitney, Hardin, Kipp & Szuch LLP

(57) ABSTRACT

A convertiplane having a wing in turn having two halfwings, each defined by a fixed portion adjacent to the fuselage, and by a movable portion rotating, with respect to the fixed portion, about a beam element extending the full length of the wing; the beam element supports, integrally, rotors located at respective ends of the wing, and engines connected to the rotors by a transmission, and is rotated about a respective axis by actuators to change the position of the rotors from a vertical-axis position wherein the convertiplane operates in helicopter mode, to a horizontal-axis position wherein the convertiplane operates in airplane mode.

9 Claims, 11 Drawing Sheets

CONVERTIPLANE

The present invention relates to a convertiplane.

BACKGROUND OF THE INVENTION

As is known, convertiplanes are hybrid tilt-rotor aircraft combining the advantages of fixed-wing, turbo-propeller aircraft and helicopters.

A fixed-wing aircraft (airplane) is maintained airborne by the lift produced by the wing. Sufficient lift to sustain the aircraft, however, can only be achieved over and above a given minimum speed, which, in turn, can only be achieved by accelerating the aircraft on a runway of appropriate length. This obviously also applies to commuter turbo-propeller airplanes. Once airborne, a turbo-propeller airplane is capable of reaching and maintaining a cruising speed of about 500 km/h and a typical altitude of 7500 meters enabling it to fly over most cloud formations and atmospheric disturbance. The continual increase in air traffic, however, will eventually result in small—e.g. 15–30-passenger—aircraft being excluded from long-distance routes, by occupying traffic windows which could be used more profitably by larger aircraft. Fixed-wing aircraft also pose environmental problems, particularly as regards acoustic pollution of residential areas around airports, which are necessarily covered at low altitude.

A helicopter is maintained airborne by the lift provided by the rotor, which is rotated relative to the air by the engines with no need for horizontal speed, so that a helicopter can take off and land vertically on small surfaces not much larger than itself. For a helicopter to acquire horizontal speed, part of its lift must be directed forwards, which is done by slightly tilting the rotor disk. Limitations inherent in the aerodynamics of the rotor, however, limit the maximum speed of a helicopter to just over 300 km/h, with a normal cruising altitude of, at best, 3000–3500 meters and a smaller range than an airplane with the same load and fuel capacity. A fundamental characteristic typical of helicopters is their ability to hover, which accounts for their being used almost exclusively in civil and military search, rescue or surveillance applications calling for direct intervention in unequipped areas.

To combine the speed, range and efficiency of a fixed-wing, turbo-propeller aircraft with the hovering and vertical takeoff and landing ability of a helicopter, convertible aircraft or convertiplanes have been developed. These are characterized by an external structure similar to that of a turbo-propeller airplane, but have two rotors, on the ends of the wing, which can be tilted upwards to sustain the craft in helicopter mode, and forwards for thrust in airplane mode, thus enabling the craft to take off and land in small spaces, in exactly the same way as a helicopter, and to cruise at high speed and altitude like an airplane. The advantages, with respect to a conventional helicopter, of such a combination therefore lie in almost twice the cruising speed (500 as opposed to 300 km/h); substantially twice the range for a given load and fuel capacity, which obviously makes the craft more profitable; and over twice the cruising altitude, so that the craft is unaffected by weather conditions (clouds, turbulence) over most of the flight. The advantages with respect to a conventional airplane, on the other hand, lie in the ability of the craft to take off and land in small spaces, and to hover.

Convertiplanes, however, are highly complex aircraft which are extremely difficult to control. Which, together with the high cost involved, is why they have so far only be used on a small scale, and substantially only for military applications.

At present, substantially two convertiplane configurations are known: tilt-rotor and tilt-wing.

In the case of the first, each engine-rotor assembly can be rotated with respect to the relative half-wing to direct the thrust of the rotor upwards when taking off, landing or hovering, or forwards for cruising. This type of configuration has several drawbacks.

In particular, the downward load on the wing caused by the wash of the rotors seriously impairs hovering performance. The resisting force (in opposition to the thrust of the rotors) may reach 10–14% of the aircraft's weight, which is a significant percentage when compared with the pay load to total aircraft weight ratio of about 20%. To minimize the phenomenon, the wing is provided with movable surfaces of a much larger area and a much wider range of movement than a conventional fixed-wing aircraft, which greatly increases the mechanical complexity of the wing.

Moreover, during conversion, the flow induced by the rotor on the wing combined with the flying speed causes the wing to operate with a very large angle of attack with respect to relative wind, which in turn causes stalling problems accompanied by vibration, oscillatory loads and high resistance. Stalling also reduces the so-called conversion corridor, i.e. the range of permissible rotor positions and aircraft speeds during conversion from helicopter mode to airplane mode and vice versa.

Another problem posed by interaction of the rotors and the fixed wing of tilt-rotor convertiplanes is the difficulty in achieving stable autorotation in helicopter mode.

In the so-called tilt-wing configuration, the position of the rotors is adjusted by rotating the whole wing-propulsion system assembly to reduce interaction of the rotor wash and the wing in helicopter mode. On the other hand, conversion from helicopter to airplane mode and vice versa is extremely critical, which is why this configuration has found very little practical application.

SUMMARY OF THE INVENTION

It is an object of the present invention to provide a convertiplane designed to eliminate the aforementioned drawbacks typically associated with known types.

According to the present invention, there is provided a convertiplane comprising:

a fuselage;

a wing having a central portion fixed to said fuselage, and two half-wings projecting from said fuselage;

two rotors carried by respective supporting structures at the ends of said half-wings, and having respective shafts;

two engines fixed to respective said half-wings by respective supporting means;

transmission means connecting each of said rotors to both said engines; and means for changing the position of said rotors between a helicopter mode wherein said shafts of said rotors are substantially vertical, and an airplane mode wherein said shafts of said rotors are substantially horizontal;

characterized in that said means for changing the position of said rotors comprise a beam element extending the full length of the wing, rotating about a respective axis, and rigidly interconnecting said supporting structures of said rotors; and first actuating means for rotating said beam element about said axis;

said half-wings comprising respective fixed portions adjacent to said fuselage, and respective movable portions rotating about said axis of said beam element;

said convertiplane comprising second actuating means for rotating said movable portions with respect to said fixed portions and to said beam element.

In a preferred embodiment of the present invention, said supporting means of said engines are also connected rigidly to said beam element.

BRIEF DESCRIPTION OF THE DRAWINGS

Two preferred, non-limiting embodiments of the present invention will be described by way of example with reference to the accompanying drawings, in which.

DETAILED DESCRIPTION OF THE INVENTION

Figure 1:
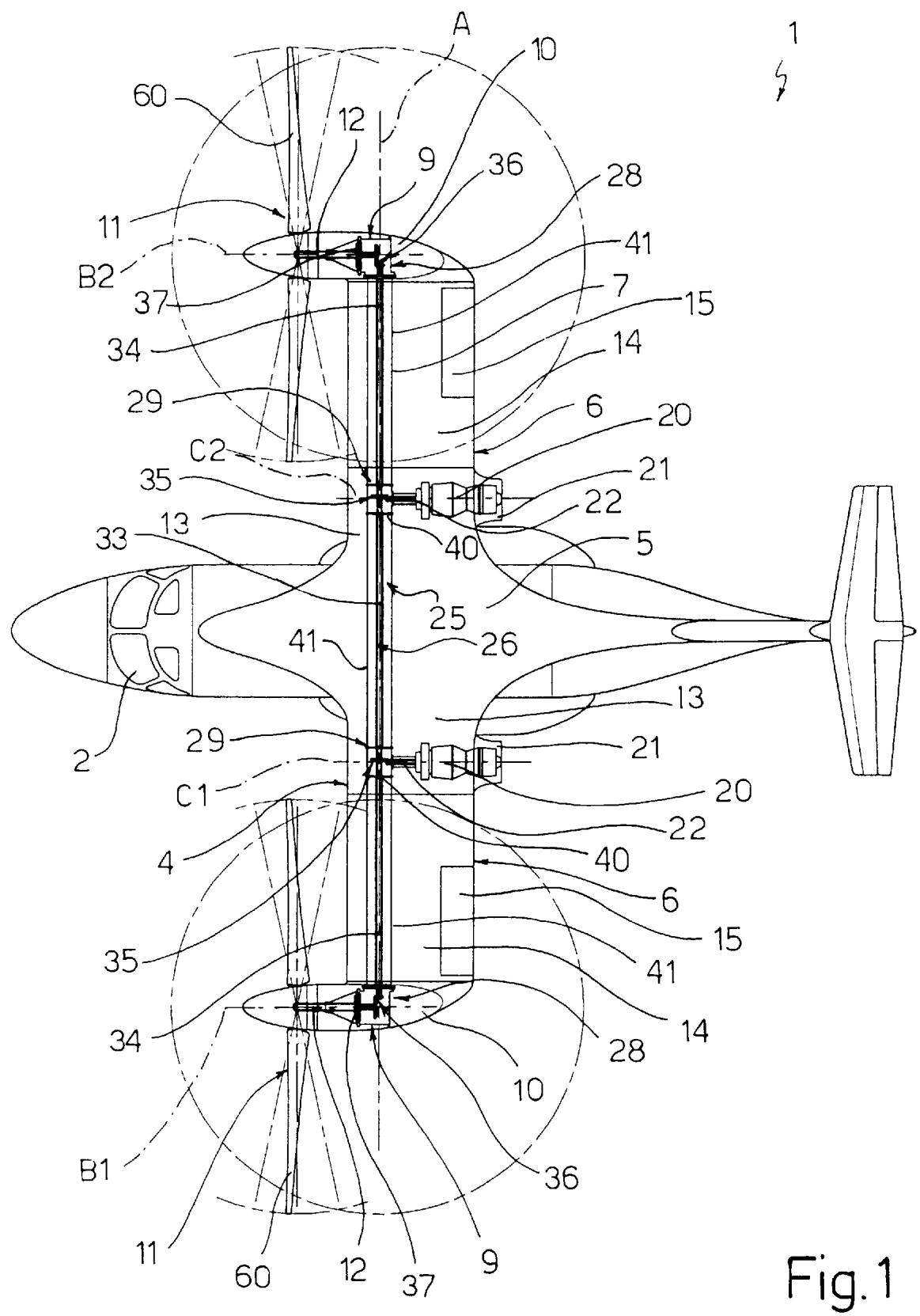
FIG. 1 shows a plan view of a first embodiment of a convertiplane in accordance with the present invention.
Figure 2:
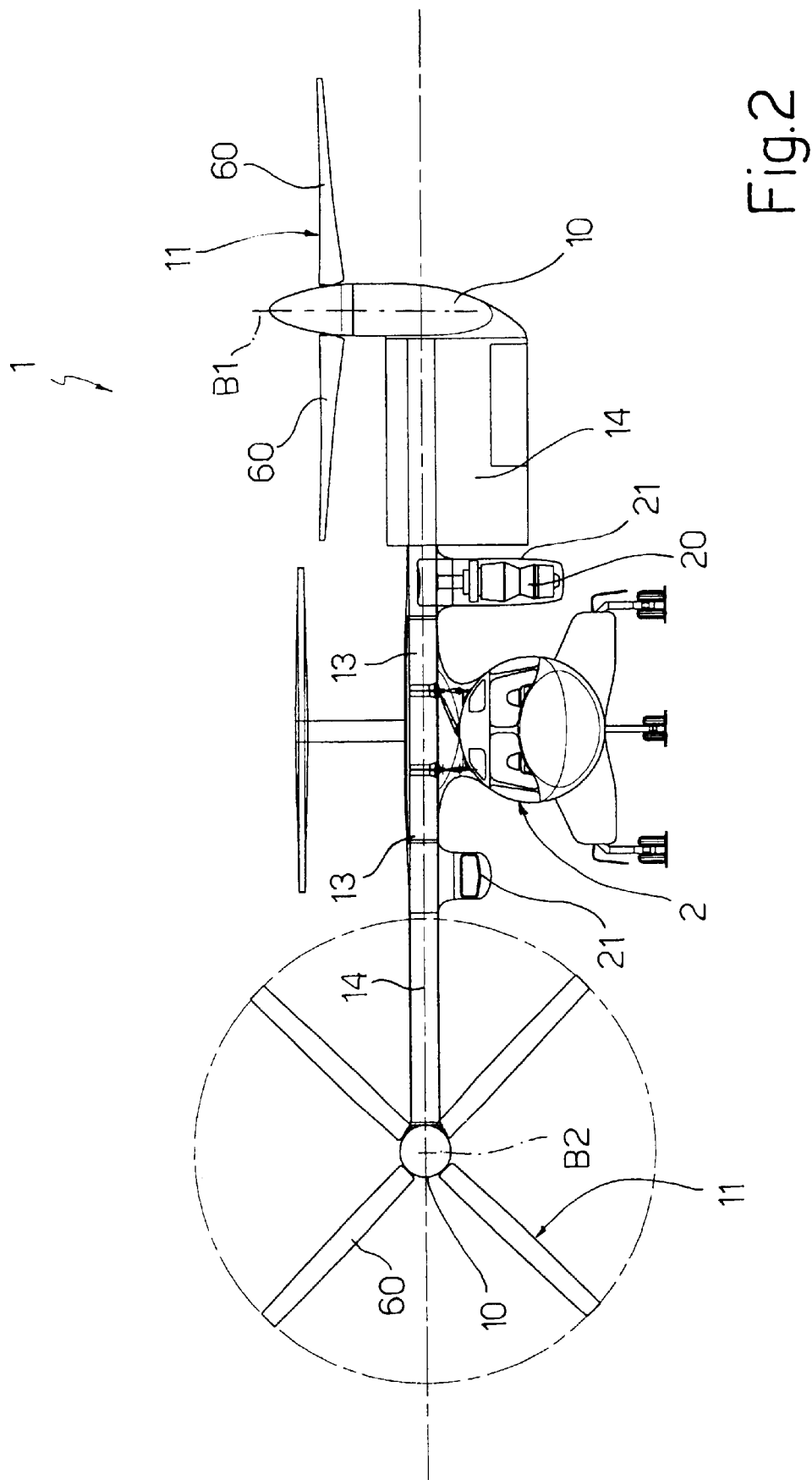
FIG. 2 shows a front view of the FIG. 1 convertiplane with a half-wing in helicopter mode and a half-wing in airplane mode.
Figure 3:
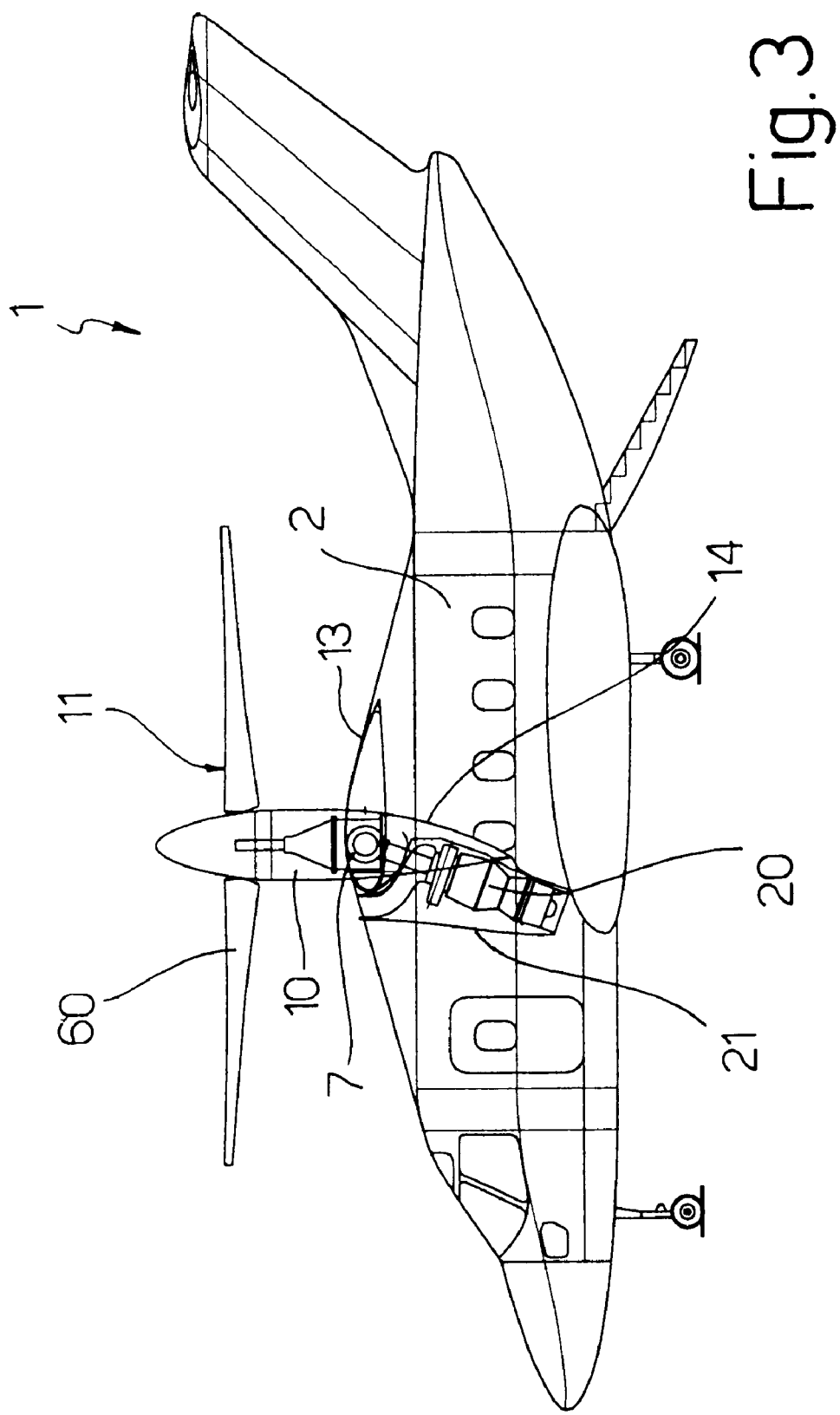
FIG. 3 shows a side view of the FIG. 1 convertiplane in helicopter mode.
Figure 4:
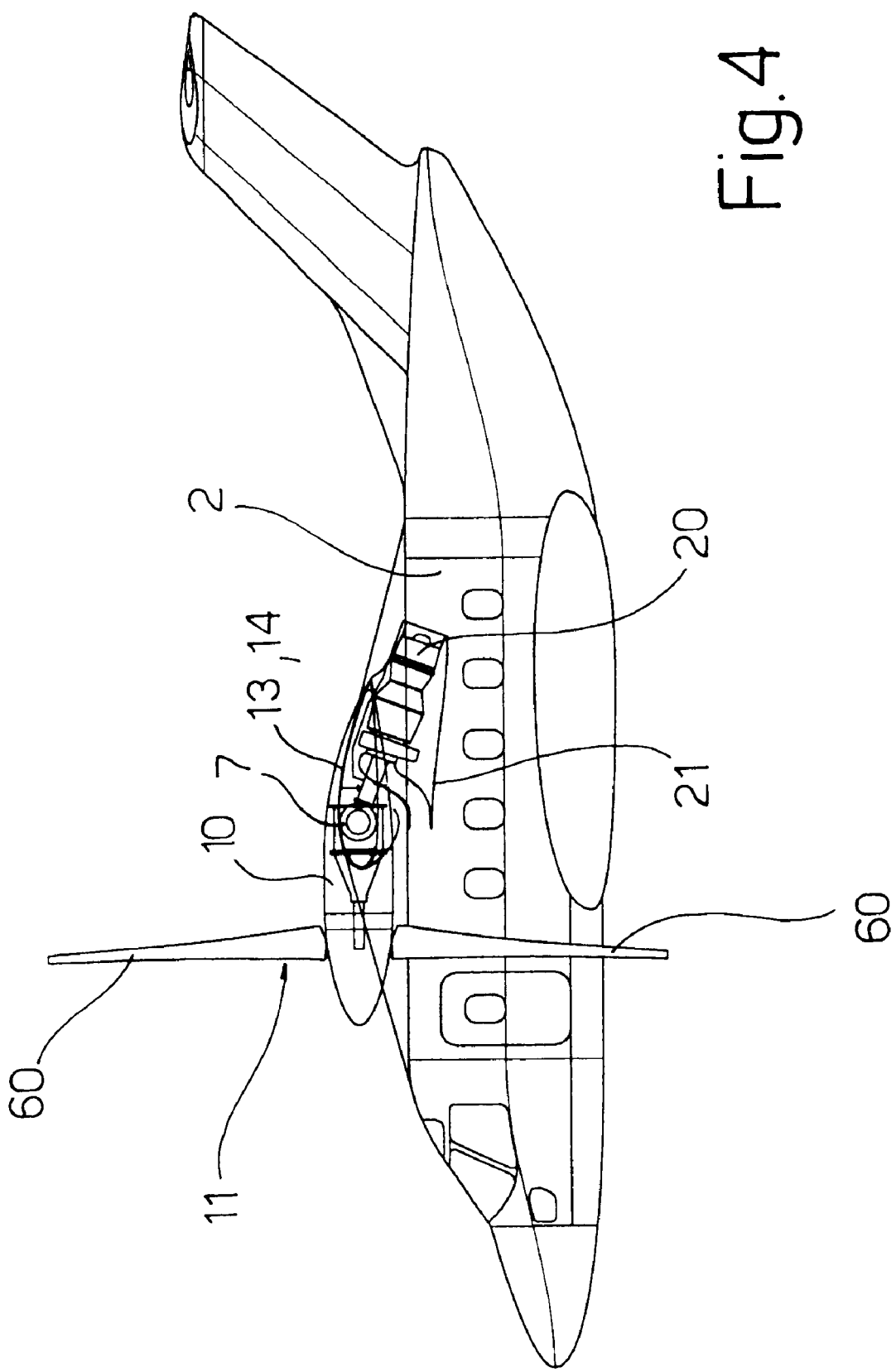
FIG. 4 shows a side view of the FIG. 1 convertiplane in airplane mode.

With reference to FIGS. 1 to 4, number 1 indicates as a whole a convertiplane comprising a fuselage 2; and a wing 4 having a central portion 5 fixed to fuselage 2, and two half-wings 6 projecting from fuselage 2.

Wing 4 houses a beam element or tubular longitudinal member 7 longitudinally extending the full length of the wing along an axis A, and rigidly interconnecting two supporting structures 9, which are housed in respective nacelles 10 located at the ends of wing 4 and supporting respective rotors 11, the shafts 12 of which—of respective axes B1 and B2—are housed inside the nacelles.

Each half-wing 6 comprises a fixed portion 13 adjacent to fuselage 2; and a movable portion 14, which rotates, with respect to fixed portion 13, about beam element 7, i.e. about axis A, and has control surfaces (ailerons) 15 for governing the aircraft in airplane mode. Movable portion 14 forms the whole of the wing portion extending between fixed portion 13 and nacelle 10 supporting respective rotor 11.

Convertiplane 1 comprises two engines 20 housed in respective power nacelles 21 located beneath fixed portions 13 of half-wings 6 and connected rigidly to beam element 7; and engines 20 comprise respective power shafts 22 having respective axes C1 and C2.

Figure 6:
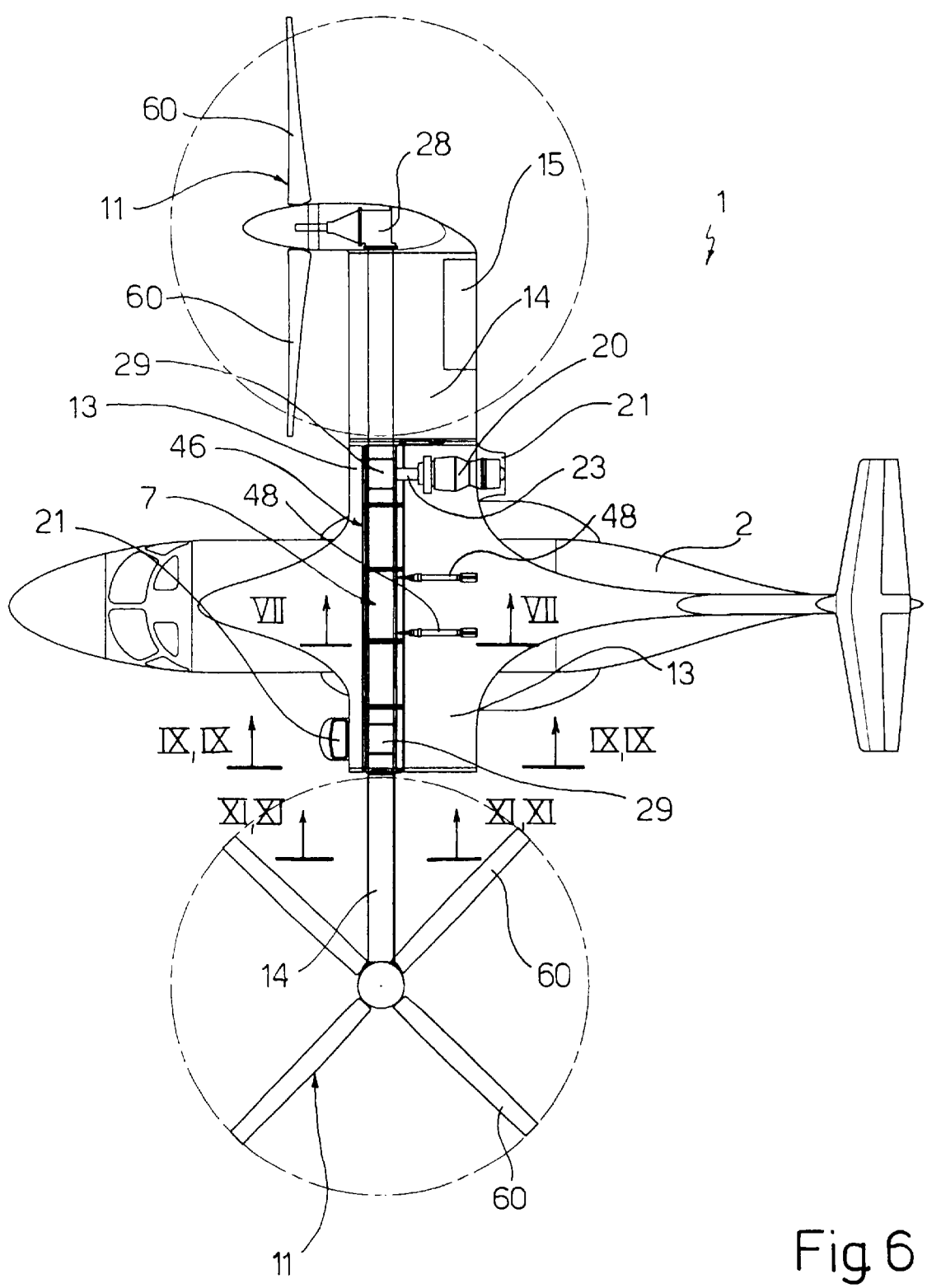
FIG. 6 shows a plan view of the convertiplane with a half-wing in helicopter mode and a half-wing in airplane mode, and illustrating schematically a device for changing the position of the rotors.
Figure 10:
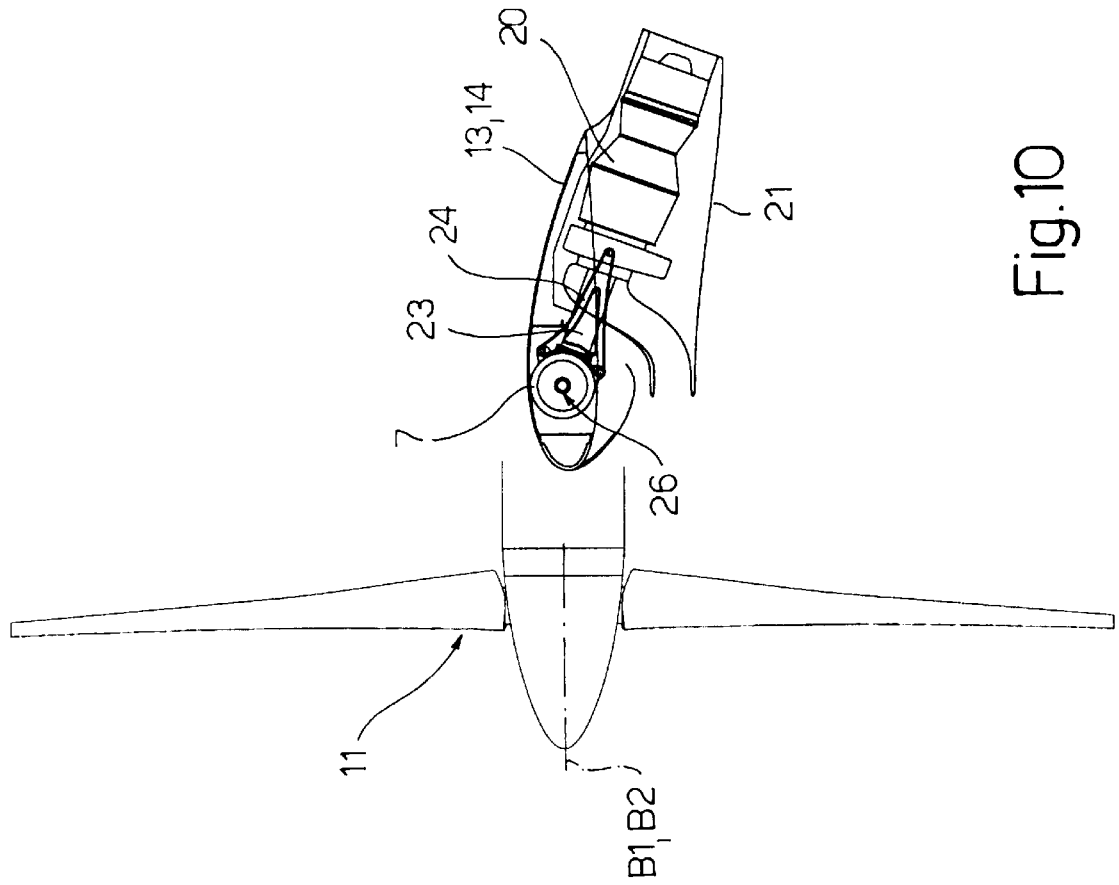
FIG. 10 shows the same section as in FIG. 9, but in a different operating position.
Figure 9:
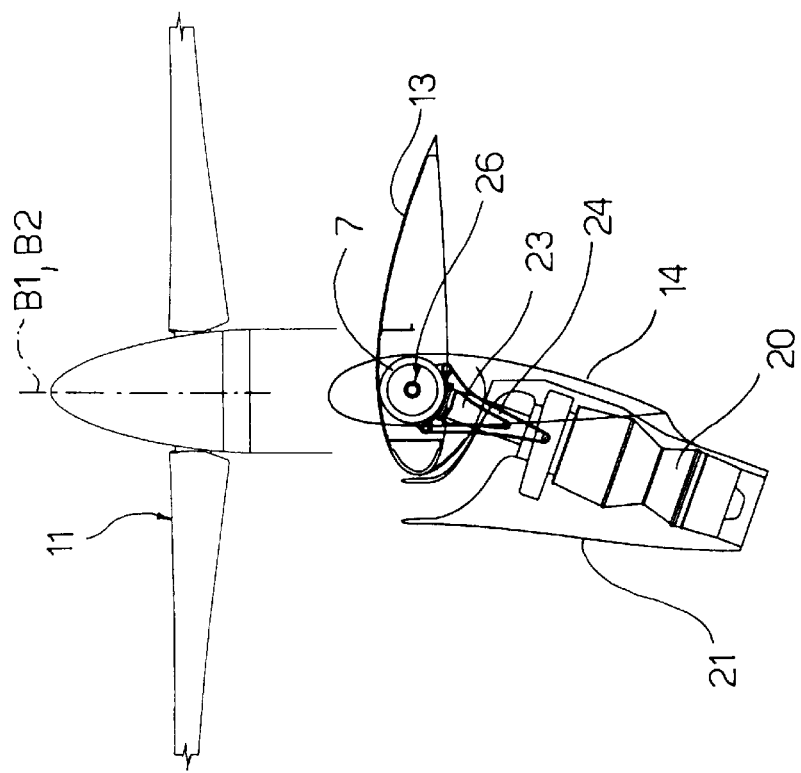
FIG. 9 shows a schematic section along line IX—IX in FIG. 6.

As shown schematically in FIGS. 6, 9 and 10, each engine 20 is conveniently connected to beam element 7 by a torque shaft 23 externally coaxial with the relative power shaft 22, and by two lateral brackets 24 projecting from beam element 7 and fixed to the sides of the engine.

Rotors 11 are connected to both engines 20 by a redundant transmission 25 for transmitting power to both rotors 11 even in the event of one of engines 20 breaking down.

Transmission 25 substantially comprises a transmission line 26, of axis A, housed inside beam element 7 and interconnecting the two rotors 11; two main gearboxes 28 housed in nacelles 10 and each interposed between transmission line 26 and a respective shaft 12 of relative rotor 11; and two intermediate gearboxes 29, each interposed between power shaft 22 of respective engine 20 and transmission line 26. More specifically, transmission line 26 comprises an intermediate shaft 33 interconnecting intermediate gearboxes 29; and two end shafts 34, each connecting an intermediate gearbox 29 to the relative main gearbox 28.

Intermediate gearboxes 29 substantially comprise respective bevel gear pairs 35 for transmitting power from axes C1, C2 to axis A, and simultaneously effecting a first rotation speed reduction from power shafts 22 of engines 20 to transmission line 26; and main gearboxes 28 substantially comprise respective bevel gear pairs 36 for transmitting power from axis A to axes B1, B2, and simultaneously effecting a second rotation speed reduction, and respective epicyclic reducers 37 for effecting a further rotation speed reduction.

Intermediate gearboxes 29 comprise respective casings 40 forming part of beam element 7, which, in fact, is conveniently formed in a number of segments 41; and casings 40 are interposed between and connected rigidly to respective pairs of segments 41.

Main gearboxes 28 comprise respective casings forming supporting structures 9 of rotors 11 and fixed rigidly to the ends of beam element 7.

End nacelles 10 house respective known devices—not forming part of the present invention and therefore not shown—for controlling the cyclic and collective pitch of rotors 11.

By virtue of the above architecture, nacelles 10 with respective rotors 11, power nacelles 21 with respective engines 20, and beam element 7 form a single unit, which may be rotated rigidly about axis A.

For which purpose, beam element 7 is mounted for rotation, by means of supporting bushes 45, inside a hollow box structure 46 extending along fixed portions 13 of half-wings 6 and central portion 5 of the wing, and forming part of the fixed structure of wing 4; and structure 46 has appropriate openings to permit the passage and movement of arms 50 of actuators 48, of shafts 23, and of brackets 24 supporting engines 20.

Figure 7:
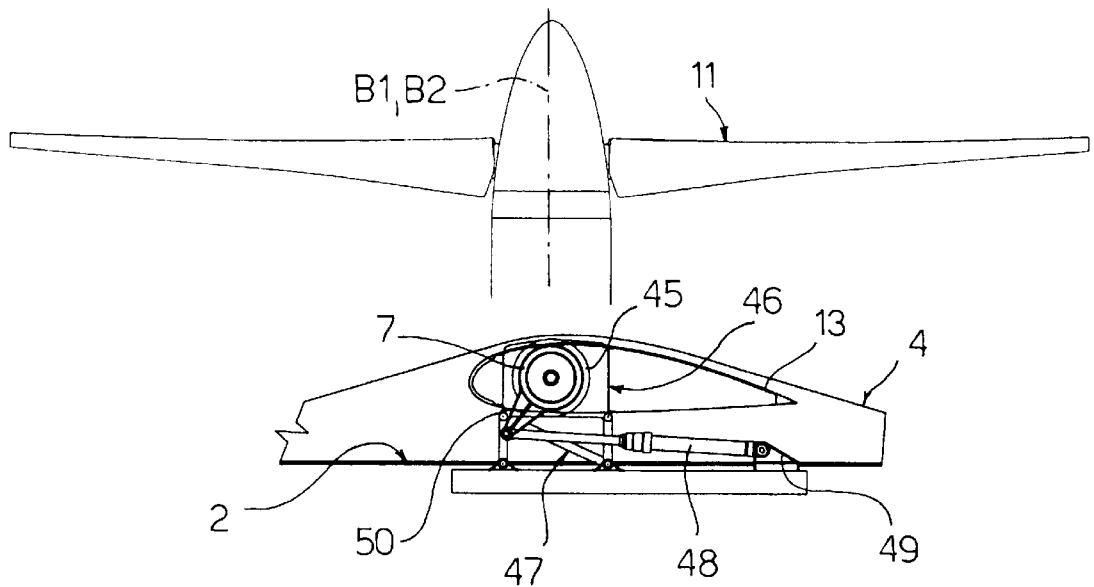
FIG. 7 shows a schematic section along line VII—VII in FIG. 6.
Figure 8:
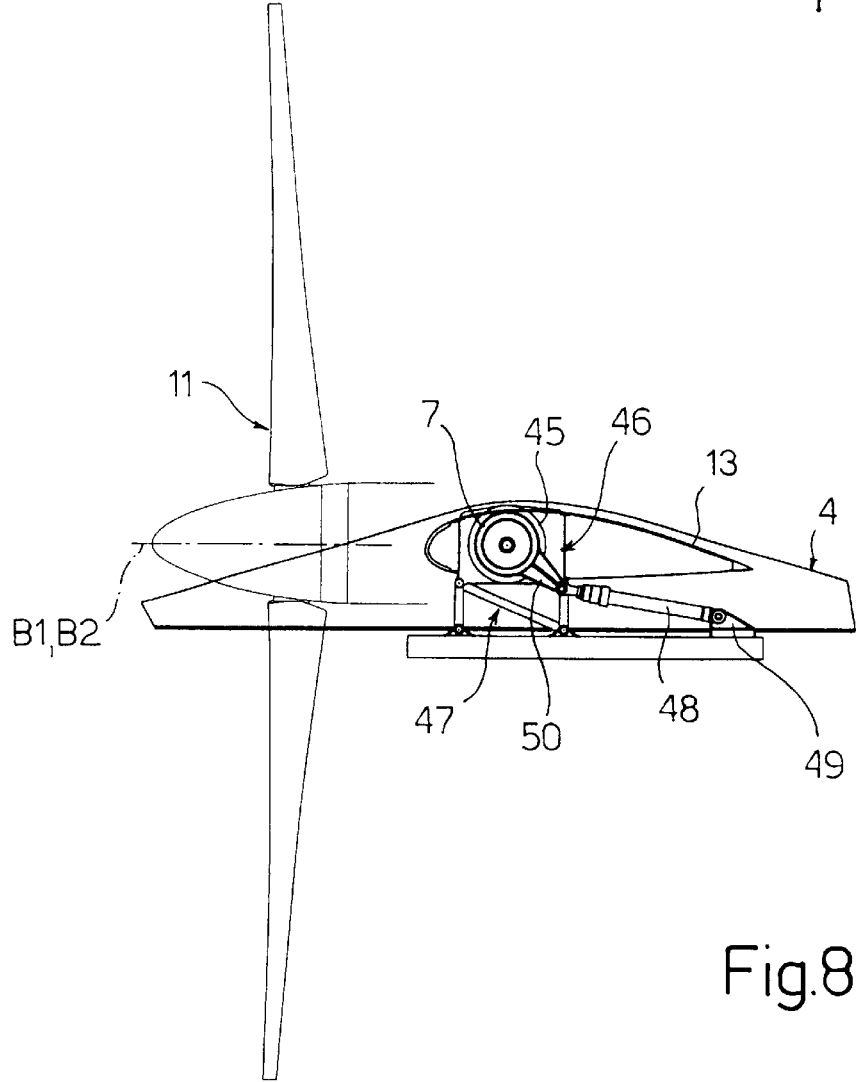
FIG. 8 shows the same section as in FIG. 7, but in a different operating position.

Structure 46 is fixed to fuselage 2 by lattice connecting trusses 47 shown schematically in FIGS. 7 and 8.

Rotation of beam element 7 is controlled by a pair of hydraulic or electromechanical actuators 48 (FIGS. 7 and 8) interposed between respective connecting brackets 49 fixed to fuselage 2, and respective radial actuating arms 50 connected rigidly to beam element 7.

Actuators 48 are movable between a first maximum-extension position (FIG. 7) wherein axes B1, B2 of shafts 12 of rotors 11 are vertical, and a second minimum-extension position (FIG. 8) wherein axes B1, B2 of shafts 12 of rotors 11 are horizontal. The above positions of axes B1, B2 correspond to respective positions, rotated 90° with respect to each other, of axes C1, C2 of engines 20 (FIGS. 9 and 10). The FIG. 7 and 9 configuration defines the helicopter mode of convertiplane 1, and the FIG. 8 and 10 configuration the airplane mode. Actuators 48, which are controlled by an on-board control system not shown, can switch continuously from the first to the second position, and vice versa, to switch from helicopter to airplane mode (and vice versa) according to predetermined laws.

Convertiplane 1 also comprises two actuators 55 (FIGS. 11 to 13), each for adjusting the position of movable portion 14 of a respective half-wing 6 with respect to fixed portion 13. More specifically, actuators 55 are movable between a first limit position wherein movable portion 14 is rotated over 90° upwards (dash line in FIG. 11), and a second limit position wherein movable portion 14 is positioned at a negative angle, e.g. of about 5–15°, with respect to fixed portion 13 (dash line in FIG. 13).

Figure 11:
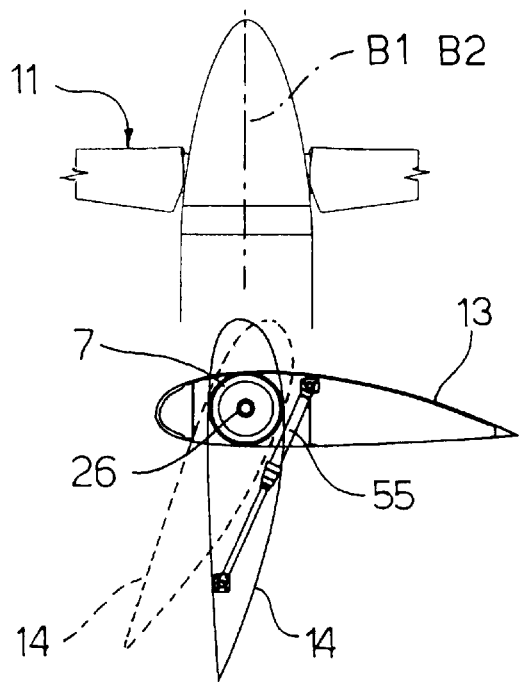
FIG. 11 shows a schematic section along line XI—XI in FIG. 6.
Figure 13:
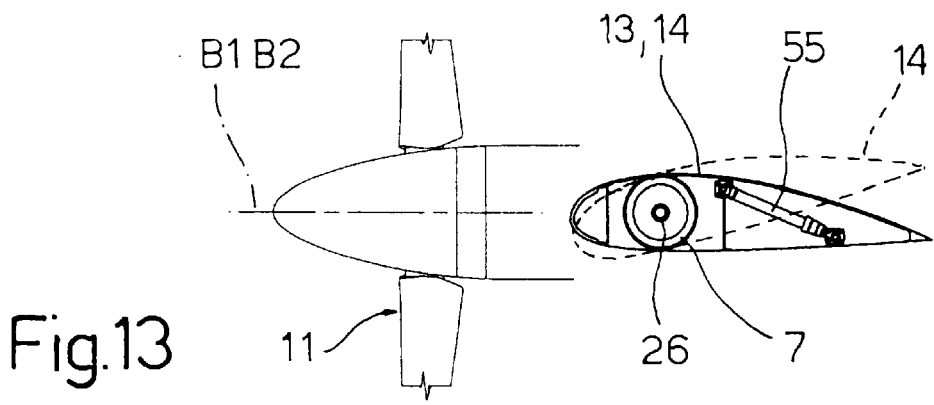

The continuous lines in FIGS. 11 and 13 show the limit positions of movable portion 14 in the normal operating range of the aircraft: rotated 900 upwards in helicopter mode, and aligned with fixed portion 13 in airplane mode, respectively.

Since the rotation of movable portions 14 is controlled by dedicated actuators independent of actuators 48 for adjusting the angular position of beam element 7, the position of movable portions 14 can be adjusted independently of that of rotors 11, particularly during conversion, to achieve the best angle of incidence of movable portions 14 in any flight condition.

Rotors 11 conveniently each comprise four blades 60, and are smaller in diameter than the height of axes B1, B2 off the ground, so as to enable rotors 11 to also rotate on the ground and permit landing in airplane mode as described below.

Convertiplane 1 operates as follows.

In helicopter mode, used for takeoff, hovering and landing, axes B1, B2 of shafts 12 of rotors 11 (FIGS. 7 and 9) are maintained vertical, and movable portions 14 of half-wings 6 lowered (FIG. 11), so as to minimize interaction between the wash of rotors 11 and movable portions 14, which, being adjacent to rotors 11, are the part of wing 4 most subject to such interaction.

The downward load produced by the current generated by rotors 11 on wing 4 is therefore greatly reduced (less than 5%), thus greatly increasing transport efficiency.

Figure 12:
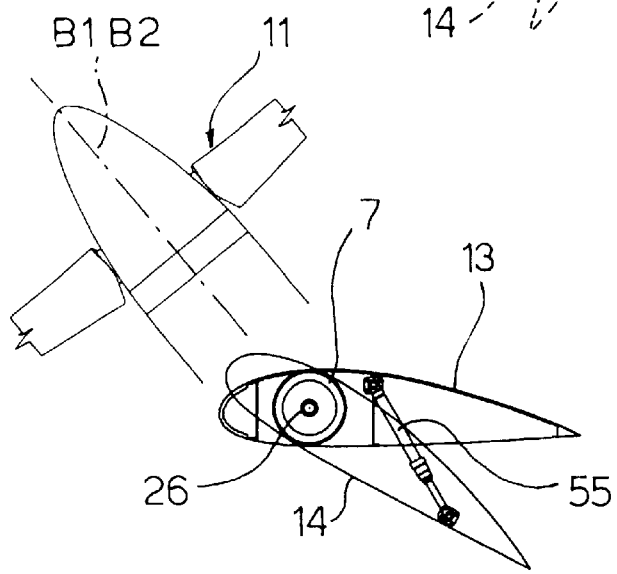
FIGS. 12 and 13 show the same section as in FIG. 11, but in two different operating positions.

During conversion, beam element 7 is gradually rotated to bring axes B1, B2 of drive shafts 12 of rotors 11 into the horizontal position. At this stage, movable portions 14 of half-wings 6 are also brought gradually into the airplane mode position and maintained equioriented at all times, but may be position controlled in coordination with but independently of the position of rotors 11 to achieve the best angle of incidence as a function of the relative wind on the wing, i.e. the current produced by the speed of flight combined with that generated by the rotor (FIG. 12).

This therefore provides for minimizing, instant by instant, any stalling effects during the maneuver, and so increasing the conversion corridor and improving the maneuverability and comfort of the aircraft.

At any rate, portions 13, which form a substantial part of the wing not greatly affected by the wash of the rotors, are fixed, which contributes towards providing lift during conversion and so avoiding any of the problems typically associated with known tilt-wing convertiplanes.

In particular operating conditions, the position of movable portions 14 of half-wings 6 may be adjusted, not only during conversion, but also with rotors 11 in helicopter mode. In particular, the maximum-positive-tilt position of portion 14 (dash line in FIG. 11) may be used for reverse flight, and the negative-tilt position (dash line in FIG. 13) for increasing traction on rotors 11 and helping to achieve stable autorotation with the engines off.

Figure 5:
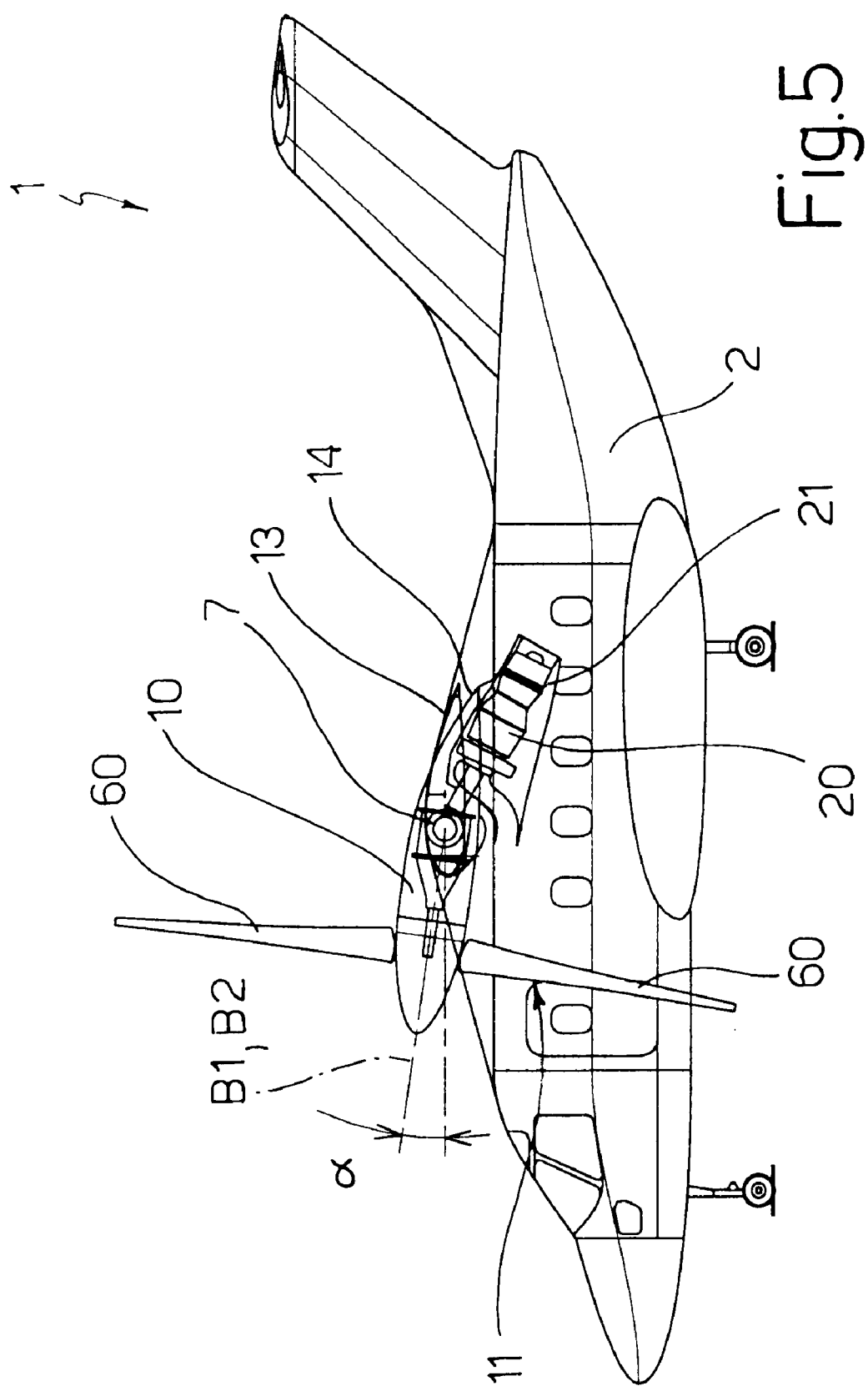
FIG. 5 shows a side view of the FIG. 1 convertiplane in airplane mode and a landing configuration.

Reducing the diameter of rotors 11 enables the craft to land in airplane mode, obviously in suitable locations. For which purpose, the rotors may be rotated upwards by an angle α, e.g. of 8° (FIG. 5), to prevent the blades from touching the ground in the event of a rough landing involving severe thrust on the landing gear.

In addition to the above advantages, employing a beam element 7, to which the end nacelles 10 of rotors 11 are connected rigidly, ensures interconnection of the rotors, which is vital function of this type of craft.

The fact that engines 20 also rotate integrally with beam element 7 greatly simplifies transmission 25, by eliminating any variation in the relative positions of the engines, the transmission 25 members, and rotors 11; nor is there any significant variation in the position of the barycenter during conversion.

Figure 14:
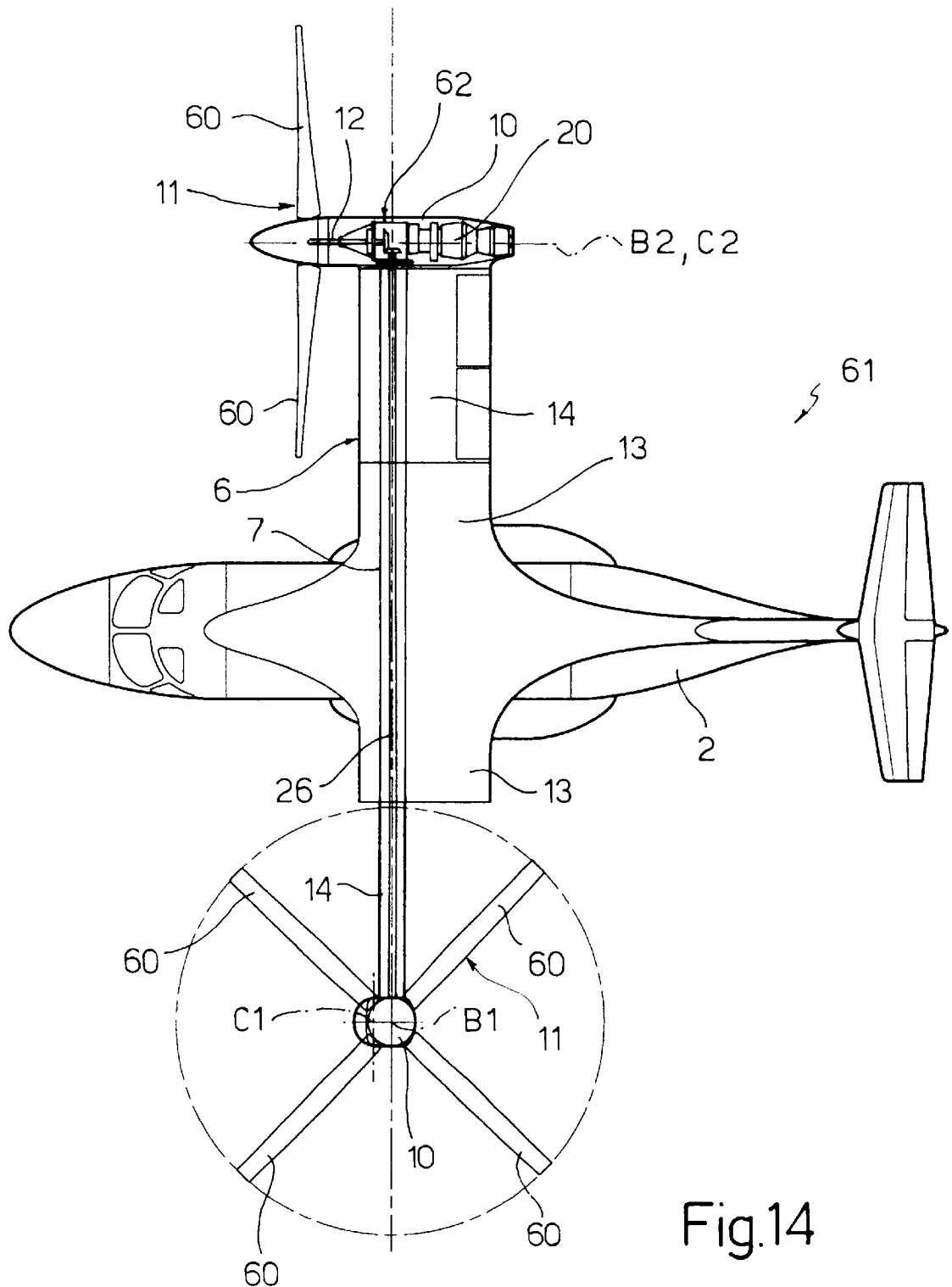
FIG. 14 shows a plan view of a second embodiment of a convertiplane in accordance with the present invention.
Figure 15:
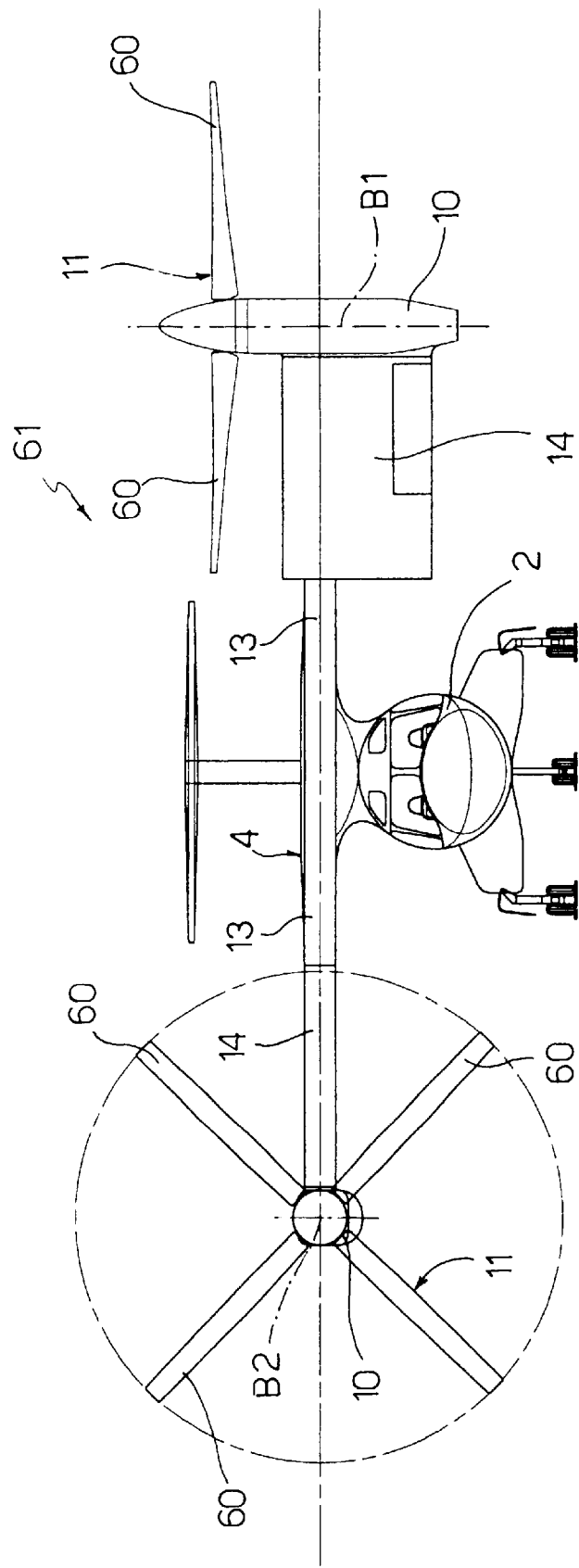
FIG. 15 shows a front view of the FIG. 14 convertiplane.

FIGS. 14 and 15 show a further embodiment of the invention. The FIG. 14 and 15 convertiplane, indicated as a whole by 61, differs from convertiplane 1 by engines 20 being housed in end nacelles 10 of wing 4, so that axes C1, C2 of power shafts 22 of engines 20 are located in the same vertical plane as axes B1, B2 of shafts 12 of rotors 11.

A respective gearbox 62 is interposed between each shaft 22 and the relative shaft 12; and the two gearboxes 62 are interconnected by a transmission line 26 extending inside beam element 7, which rigidly interconnects nacelles 10.

Clearly, changes may be made to convertiplanes 1, 61 as described herein without, however, departing from the scope of the present invention. In particular, engines 20 may be fixed, as opposed to rotating with beam element 7. This simplifies installation of the engines, but, on the other hand, complicates transmission 25 and calls for centering control during conversion.

What is claimed is:

1. A convertiplane (1) comprising:
   a fuselage (2);
   a wing (4) having a central portion (5) fixed to said fuselage (2), and two half-wings (6), projecting from said fuselage (2);
   two rotors (11) carried by respective supporting structures (9) at opposite ends of the half wings (6), and having respective shafts (12);
   two engines (20) fixed to respective said half-wings (6) by respective supporting means (23, 24);
   transmission means (25) connecting each of said rotors (11) to both said engines (20); and
   means (7, 48) for changing the position of said rotors (11) between a helicopter mode wherein said shafts (12) of said rotors (11) are substantially vertical; and an airplane mode wherein said shafts (12) of said rotors (11) are substantially horizontal;
   wherein said means (7, 48) for changing the position of said rotors (11) comprising a beam element (7) extending the full length of the wing (4), rotating about a respective axis (A), and rigidly interconnecting said supporting structures (9) of said rotors (11); and first actuating means (48) for rotating said beam element (7) about said axis (A);

said half-wings comprising respective fixed portions (13) adjacent to said fuselage (2), and respective movable portions (14) located between said fixed portions (13) and the respective supporting structures (9) of said rotors (11) and rotatable about said beam element (7);

said convertiplane (1) comprising second actuating means (55) for rotating said movable portions (14) with respect to said fixed portions (13) and to said beam element (7).

2. A convertiplane as claimed in claim 1, characterized in that said supporting means (23, 24) of said engines (20) are connected rigidly to said beam element (7).

3. A convertiplane as claimed in claim 1, characterized in that said beam element (7) is tubular; said transmission means (25) comprising a transmission line (26) for transmitting motion between the two rotors (11) and housed inside said beam element (7).

4. A convertiplane as claimed in claim 1, characterized in that said beam element (7) is supported in freely rotating manner inside a hollow box structure (46) fixed to said fuselage (2).

5. A convertiplane as claimed in claim 4, characterized in that said box structure (46) is fixed to said fuselage (2) by means of at least one lattice truss (47).

6. A convertiplane as claimed in claim 1, characterized in that said engines (20) are housed in respective nacelles (10) located at the ends of said half-wings (6) and housing said supporting structures (9) and said shafts (12) of said rotors (11).

7. A convertiplane (1) comprising:

a fuselage (2);

a wing (4) having a central portion (5) fixed to said fuselage (2), and two halfwings (6), projecting from said fuselage;

two rotors (11) carried by respective supporting structures (9) at the ends of the half wings (6), and having respective shafts (12);

two engines (20) fixed to respective said half-wings (6) by respective supporting means (23, 24);

transmission means (25) connecting each of said rotors (11) to both said engines (20); and means (7, 48) for changing the position of said rotors (11) between a helicopter mode wherein said shafts (12) of said rotors (11) are substantially vertical; and an airplane mode wherein said shafts (12) of said rotors (11) are substantially horizontal;

wherein said means (7, 48) for changing the position of said rotors (11) comprise a beam element (7) extending the full length of the wing (4), rotating about a respective axis (A), and rigidly interconnecting said supporting structures (9) of said rotors (11); and first actuating means (48) for rotating said beam element (7) about said axis (A);

said half-wings comprising respective fixed portions (13) adjacent to said fuselage (2), and respective movable portions (14) rotating about said axis (A) of said beam element (7);

said convertiplane (1) comprising second actuating means (55) for rotating said movable portions (14) with respect to said fixed portions (13) and to said beam element (7); and said engines (20) are housed in respective nacelles (21) located at said fixed portions (13) of said half wings (6) and movable integrally with said beam element (7).

8. A convertiplane as claimed in claim 7, characterized in that said transmission means (25) comprise two intermediate gearboxes (29) for connecting respective power shafts (22) of said engines to said transmission line (26); and respective main gearboxes (28), each interposed between a respective end of said transmission line (26) and the respective rotor (11).

9. A convertiplane as claimed in claim 8, characterized in that said supporting structures (9) for supporting said rotors (11) are defined by respective casings of said main gearboxes (28) fixed rigidly to said beam element (7); the tubular said beam element (7) being defined by a number of rigidly interconnected elements (40, 41) comprising respective casings (40) of said intermediate gearboxes (29).

* * * * *

UNITED STATES PATENT AND TRADEMARK OFFICE
CERTIFICATE OF CORRECTION

PATENT NO.     : 6,367,736 B1
DATED          : April 9, 2002
INVENTOR(S)    : Santino Pancotti It is certified that error appears in the above-identified patent and that said Letters Patent is hereby corrected as shown below:

<u>Column 5,</u>
Line 36, change "diameter" to -- radius --.

Signed and Sealed this

Twenty-fourth Day of September, 2002

Attest:

Attesting Officer

JAMES E. ROGAN
*Director of the United States Patent and Trademark Office*